Feb. 28, 1939. J. H. COX 2,148,730

APPARATUS FOR DISPENSING FLUIDS

Original Filed June 3, 1936

INVENTOR.
JAMES H. COX
BY
*Samuel C. Ford*
ATTORNEY.

Patented Feb. 28, 1939

2,148,730

UNITED STATES PATENT OFFICE 2,148,730

APPARATUS FOR DISPENSING FLUIDS

James H. Cox, Los Angeles, Calif., assignor of one-half to Daniel W. Cox, Los Angeles, Calif.

Application June 3, 1936, Serial No. 83,375
Renewed January 6, 1939

3 Claims. (Cl. 221—95)

This invention relates to apparatus for dispensing fluids, and in particular to those installations used for servicing automotive vehicles and commonly called gasoline pumps. It is to be understood, however, that the improvement may be used for dispensing other fluids and in connection with other types of dispensers.

In the type illustrated, it is customary to have a comparatively long flexible hose connecting the dispensing nozzle and the measuring pipe within the pump, so that it may be possible to reach the gasoline tanks of automobiles when parked within a reasonable radius. This flexible hose is connected with the measuring pipe close to the top of the pump, so that the flow can operate various meters, and extends downwardly almost to the ground level and then upwardly almost to the top again; the hose thus forming a long and unsightly loop. Such a loop is not only unsightly but forms a hazard, since it is quite possible for bumpers or hub caps of automobiles to catch in it and cause damage. It is the object of this invention to correct this unsightliness and remove the hazard by keeping the hose substantially entirely out of sight, except when actually in use.

Figure 1:
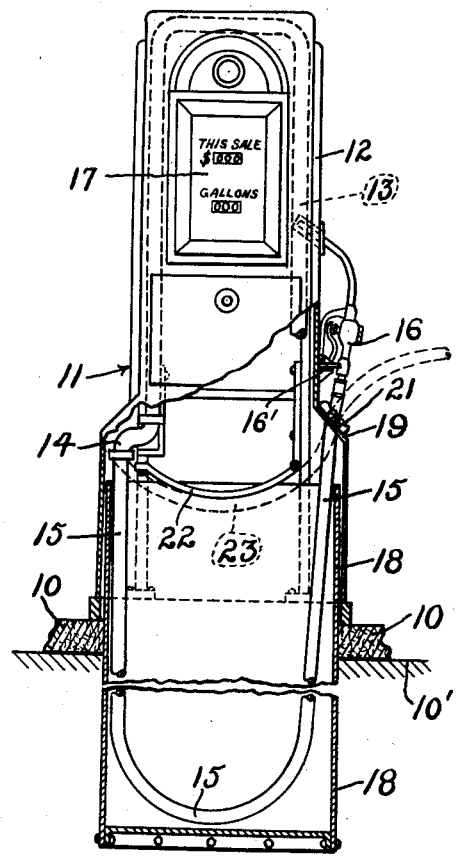
Figure 2:
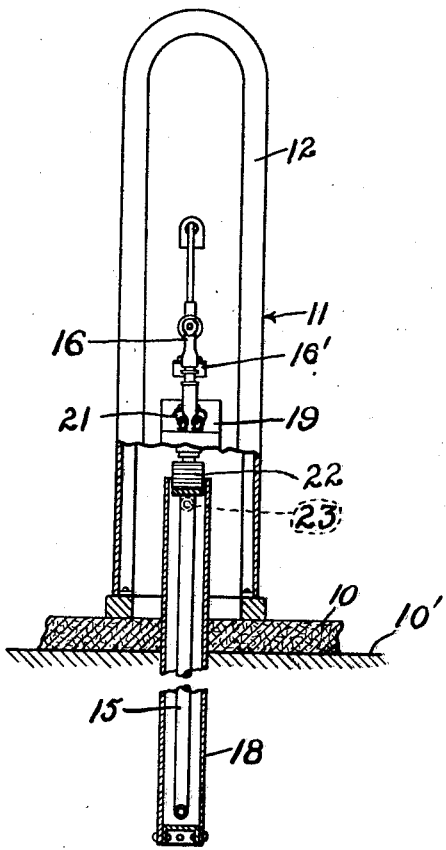
Figure 3:
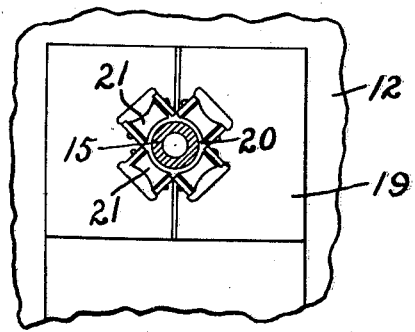

In the drawing, Fig. 1 is a front elevation, partly in section, of the invention as applied to a gasoline pump;

Fig. 2 is a side elevation, partly in section, of the apparatus shown in Fig. 1; and Fig. 3 is an enlarged plan view of a detail.

Referring more particularly to the drawing, 10 is a platform, generally referred to as an "island", of concrete, upon which the gasoline pump is mounted; the pump being indicated generally by the reference numeral 11. The ground level is shown at 10'. Such a pump comprises a casing, a measuring pipe leading from a source of gasoline through the pump, an outlet coupling leading to the flexible hose and discharge nozzle, various pumping and other mechanisms, and a meter system governed by the gasoline flow for showing the gallons, price, etc. The measuring pipe is so called because it carries the fluid to the meter system. All of these features are old and are not claimed as a part of the invention.

In the drawing, the casing is shown at 12, the measuring pipe at 13, the outlet port, as a coupling, at 14, the flexible hose at 15, the nozzle at 16, and the visible part of the meter (sometimes termed the visimeter) at 17. None of the internal structure is shown, since it is not necessary for an understanding of the invention. The nozzle, when not in use, rests on a platform or support 16', extending from the casing.

The outlet coupling 14, in pump as now used, would be very close to the top of the pump, at the left in Fig. 1, and the hose 15 would extend in a long loop almost to the island 10 and back nearly to the outlet port. But in the device to be claimed, the coupling is hidden within the casing 12 and serves to connect the measuring pipe 13 and the flexible hose 15, as seen in Fig. 1. Set within the casing 12 is a container or guide 18 which extends a suitable distance into the ground and is adapted to contain the hose 15. As seen in Fig. 1, the hose, when not in use, extends downwardly in a long loop within the container 18. When the flow of the liquid is cut off at the nozzle 16, the hose is full of the liquid and the combined weight of the hose and its contained liquid together with the natural rigidity of the hose are sufficient to retract the hose without the use of a counterweight. On a shoulder 19 of casing 12 is an aperture 20 bounded by concave rollers 21. Hose 15 extends through this aperture and is guided by the rollers, which are shown with their axes arranged at an angle of 45° in respect to the vertical. The rollers are so arranged because the hose 15, when withdrawn for the servicing of an automobile, is of course pulled to one side, and thus the rollers afford a better contact with the hose when arranged as shown.

As seen in Fig. 2, the container 18 is comparatively narrow; the purpose being to prevent any side twisting and kinking of the hose. It is possible to make the container or guide narrow, as shown in Fig. 2, because, as has been stated, no counterweight is employed for retracting the hose. The two vertical end walls of the container, as shown in Fig. 1, are spaced sufficiently to receive the vertically-extending parts of the loop between them without frictional contact therewith, while the vertical side walls, as shown in Fig. 2, are so close together that they will engage the hose at the sides of the depending loop and prevent it from twisting. While the container or guide projects upwardly for some distance into the hollow base portion of the casing, the casing and the container are two separate elements with distinctly different functions. Adjacent the top of the container 18 is a band or plate, 22, of suitable material, the same being curved downwardly and secured in any suitable manner to the framework of the pump 11. When the hose 15 is pulled out to its maximum extent, the hose contacts the band 22, as shown in dotted lines at 23 in Figs. 1 and 2, and is thereby prevented from distortion and kinking.

The invention thus comprises a gasoline pump in combination with a subterranean container for the servicing hose; the hose being out of sight when not in use. This prevents accidents to the hose and pump, and greatly improves the appearance of the device. It will be understood, also, that the container may extend as deeply as is practicable and that therefore the hose may be made as long as desired. In pumps as now used, the hose is limited to approximately twice the height of the pump.

Having thus described my invention, I claim:

1. An apparatus for dispensing a fluid which comprises a hollow casing above the ground level, said casing being open at its base, a supply pipe for the fluid supported within said casing and having a delivery nozzle at one end outside the casing, said pipe looping downwardly within the casing and through the open base of the latter and being capable of being drawn out at its nozzle end from the casing and of being retracted toward the latter, a guide housing for the hose extending upwardly through the open base of the casing and downwardly into the ground below the casing, said guide housing having an open upper end to receive and house the loop of the hose and permit it to rise and fall as the nozzle is moved from and toward the casing, said housing being sufficiently wide in the plane of the loop to receive the spaced vertically-extending portions of the loop without frictionally contacting them and sufficiently narrow transversely of said plane to guide the loop and prevent the hose from twisting laterally.

2. Apparatus for dispensing a fluid which comprises a hollow casing, a fluid-supply pipe leading from the pump, and terminating outside the casing, a delivery nozzle on the pipe at its outer end, said pipe being so supported within the casing as to loop downwardly and then rise from the bight of the loop and pass outside the casing from which it may be extended and retracted, a guide housing for the loop of the pipe, said housing extending upwardly within the casing and downwardly from the base of the casing into the ground, the upper end of the housing being open and the housing being wide enough in the plane of the loop to receive the spaced, vertically-extending portions of the loop without frictionally contacting them and narrow enough transversely of said plane to guide the loop and prevent the pipe from twisting laterally, and means adjacent the top of the said guide housing for limiting the extension of the delivery pipe from the casing and to prevent kinking of the pipe.

3. Apparatus as set forth in claim 2 in which the means for limiting the extension of the pipe is a band or plate which is curved downwardly and is adapted to contact the pipe at the bight of the loop when the pipe is drawn out to its maximum extent.

JAMES H. COX.